Nov. 30, 1965  R. S. SCRANTON ETAL  3,220,255
THERMAL MASS FLOWMETER
Filed Dec. 3, 1962  3 Sheets-Sheet 1

INVENTORS
RICHARD S. SCRANTON
GEORGE R. BOONE
BY
William R. Jacox
ATTORNEY

INVENTORS
RICHARD S. SCRANTON
GEORGE R. BOONE
BY *William R Jacox*
ATTORNEY

United States Patent Office 3,220,255
Patented Nov. 30, 1965

3,220,255
THERMAL MASS FLOWMETER
Richard S. Scranton, Dayton, Ohio, and George R. Boone, San Antonio, Tex., assignors to Technology, Incorporated, a corporation of Ohio
Filed Dec. 3, 1962, Ser. No. 241,583
3 Claims. (Cl. 73—204)

This invention relates to an instrument. The invention relates more particularly to an instrument for indicating and/or measuring mass flow rate of a fluid.

An object of this invention is to provide an instrument which indicates and/or measures mass flow rate of a fluid under varying conditions of temperature and density thereof.

Another object of this invention is the provision of such an instrument which has an electrical output which is linear with the mass flow rate of the fluid.

Another object of this invention is to provide an instrument for indicating and/or measuring mass rate of fluid flow output, which output when integrated with respect to time for a given time interval will yield the total mass flow for that time interval.

Another object of this invention is to provide such an instrument which when subjected to a pulsating flow may be used to count the pulsations.

Another object of this invention is to provide an instrument for indicating and/or measuring mass rate of fluid flow which instrument has rapid response to changes in mass rate of fluid flow.

Another object of this invention is to provide such an instrument which offers a minimum obstruction to fluid flow.

Another object of this invention is to provide such an instrument which is self-contained, rugged, and which is comparatively light in weight and small in physical size.

Other objects and advantages reside in the construction of parts, the combination thereof, the method of manufacture, and the mode of operation, as will become more apparent from the following description.

Figure 1:
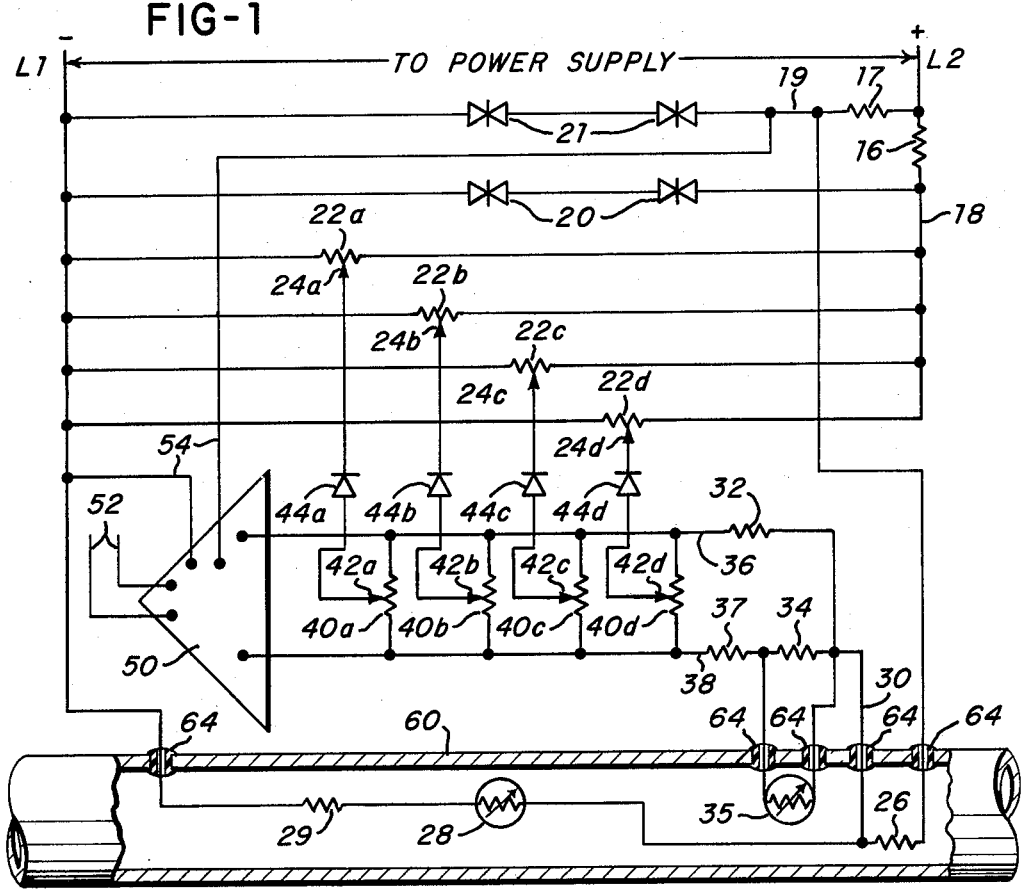
FIGURE 1 is a schematic wiring diagram of an instrument of this invention for indicating and/or measuring mass rate of fluid flow.

Referring to the drawings in detail, the instrument of this invention as shown in FIGURE 1 includes terminal leads L1 and L2 which are adapted to connect to a source of electrical energy, i.e., a power supply. A resistor 16 is shown connected between a conductor 18 and the terminal L2.

One or more diode members 20, preferably Zener type of diodes, are connected from the terminal lead L1 to the conductor 18 and serve as voltage regulation means. However, other types of voltage regulation means may be used if desired. A resistor 17 connects to the line L2. A conductor 19 joins the resistor 17 to a series of diode members 21, preferably Zener type diodes, which in turn are connected to the line L1.

A plurality of biasing resistors 22a, 22b, 22c, and 22d are connected in parallel between the lead L1 and the conductor 18. The bias resistors, of which there may be any suitable or desired number, 22a, 22b, 22c, and 22d serve as voltage divider members and are shown as having taps 24a, 24b, 24c, and 24d, respectively.

Connected to the conductor 19 is a resistor 26. The resistor 26 is a temperature sensitive resistor having a positive temperature characteristic, i.e., the resistance thereof increases with an increase in the temperature thereof. The resistor 26 is connected with a temperature sensitive resistance member or element 28 which is of a type which has a negative temperature characteristic, i.e., the resistance thereof decreases with increase in temperature thereof. The resistance member 28 may be of a type known as a thermistor or the resistance member 28 may be of any other suitable type. In series with the resistance member 28 is a resistor 29 which is also sensitive to temperature, having a positive temperature characteristic. The resistor 29 is also joined to the line L1.

Connected to a position intermediate the resistor 26 and the resistance element 28 is a conductor 30 which is joined to a function generator type of network which includes fixed resistors 32 and 34. Connected in parallel with the resistor 34 is a temperature sensitive resistance element or thermistor 35 which has a negative temperature characteristic. Connected in series with the parallel resistor combination 34 and 35 is a resistor 37. A conductor 36 is connected to the resistor 32. A conductor 38 is connected to the resistor 37. Connected in parallel relationship across the conductors 36 and 38 are a plurality of resistors, of which there may be any suitable or desired number, herein shown as resistors 40a, 40b, 40c, and 40d, having taps 42a, 42b, 42c, and 42d, respectively.

Diode or rectifier members 44a, 44b, 44c, and 44d are connected to the taps 42a, 42b, 42c, and 42d, respectively. The diodes 44a, 44b, 44c, and 44d are also connected to the taps 24a, 24b, 24c, and 24d, respectively.

The conductors 36 and 38 connect to an amplifier 50 which may be used if desired or necessary. The amplifier 50 has output lines 52. The amplifier 50 also has leads 54 which join to a power supply. Herein the leads 54 connect to the conductor 19 and to the lead L1 to obtain a power supply or a source of electrical energy.

Operation

The temperature sensitive resistance elements 28 and 35 and the temperature sensitive resistors 26 and 29 are adapted to be disposed within a fluid conduit, such as within a conduit 60, shown in FIGURE 1, within which there is fluid flow. Grommets 64 or any other suitable means are used in the wall portions of the conduit 60 through which the conductor members extend to connect the elements 29, 28, and 26. The temperature sensitive resistance elements or thermistors 28 and 35 and the temperature sensitive resistors 26 and 29 may be of comparatively small physical size so that there is negligible restriction to fluid flow caused thereby.

The voltage applied to the resistance element 28 is such that the current flowing therethrough causes heating thereof above the temperature of the fluid which is in engagement therewith. Thus, the resistance element 28 is said to be operated in a self-heating region. When the resistance element 28 is operated in a self-heating region with a constant voltage applied thereto, the temperature of the resistance element 28 is dependent upon conditions of the fluid in engagement therewith. Therefore, the voltage across the resistance element 28 increases with a decrease in temperature thereof and vice versa.

It is also to be noted that the voltage from line L1 to conductor 19 is applied across the combination of the resistor 29, the resistance element 28, and the resistor 26. Thus, the voltage from line L1 to conductor 19 is divided among the elements 29, 28, and 26.

The resistors 26 and 29, as stated above, have a positive temperature characteristic so that the resistance thereof increases considerably with slight increase in temperature thereof and vice versa.

As stated above, the resistance element or thermistor 28 is operated in its self-heating region and the resistance thereof decreases considerably with slight increase in temperature thereof, and vice versa.

Figure 2:
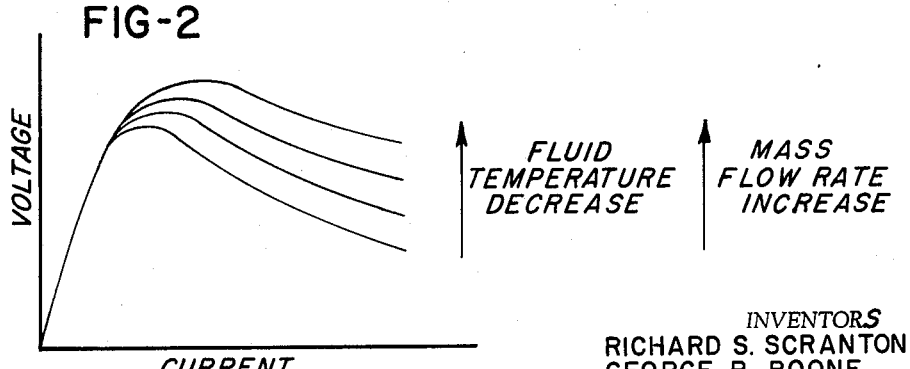
FIGURE 2 is a diagram illustrating the operation of an element of the instrument of this invention.

FIGURE 2 illustrates the voltage-current characteristics of the resistance element 28. This figure shows a family of curves, each curve relates to a different fluid temperature and/or mass flow rate of fluid within the conduit 60. Actually, there is a multiplicity of possible curves, each of which relates to a temperature and/or mass flow rate which may occur in the fluid. It is to be noted that the highest voltage curve relates to the lowest temperature and/or highest mass flow rate of the fluid.

Due to the fact that the resistance element 28 is operated in its self-heating region and is always at a temperature greater than that of the fluid flowing through the conduit 60, the temperature of the resistance element 28 varies with changes in the mass flow rate of the fluid flowing through the conduit 60. This is due to the fact that greater mass rate of fluid flow provides a greater thermal conductor to which heat from the resistance element 28 is transferred. Also, of course, the temperature of the resistance element 28 varies with changes in temperature of the fluid flowing through the conduit 60.

However, due to the fact that the resistors 26 and 29 have a positive temperature characteristic while the resistance element 28 has a negative temperature characteristic, there is automatic temperature compensation in these elements 26, 28, and 29 of the circuit. In other words, any decrease in resistance of the resistance element 28 caused by a change in the temperature of the fluid is substantially compensated for by an increase in resistance of the resistance elements 29 and 26.

The resistance element 35 is similar to the resistance element 28, but is not operated in a self-heating region and merely responds to temperature of the fluid in the conduit 60. The resistance element 35 is disposed within the conduit 60 and is connected in parallel with the resistor 34. Thus, the effective resistance of the resistor 34 is dependent upon the resistance of the resistance element 35, and the resistance of the resistance element 35 is dependent upon the temperature of the fluid within the conduit 60. Therefore, the resistance element 35 serves as temperature sensing means for the function generator and has a controlling effect upon the sensitivity of the function generator.

Therefore, these elements 26, 28, 29, and 35 provide means by which the mass rate of the fluid flowing through the conduit 60 can be accurately determined regardless of the temperature thereof, so long as the temperature of the resistance element 28 remains above the temperature of the fluid. Therefore, the resistance elements 26, 28, 29, and 35 provide a circuit in which the voltage between line L1 and conductor 30 is dependent upon the mass rate of fluid flow.

Due to the fact that the conductor 30 is connected to the resistance element 28, the voltage of the conductor 30 with respect to the line L1 varies as the voltage across the series of the resistance elements 28 and 29 changes. Therefore, the voltage from the conductor 30 to the line L1 is responsive to the mass rate of fluid flowing in the conduit 60.

Figure 3:
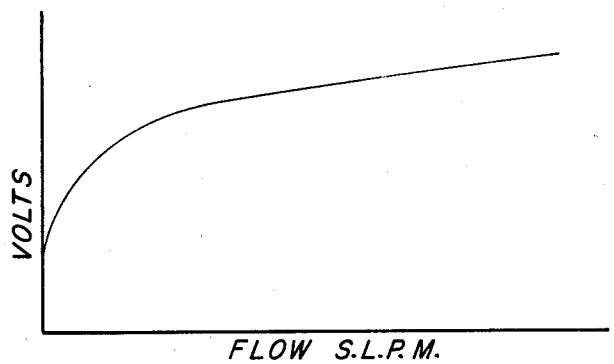
FIGURE 3 is a diagram illustrating the operation of a portion of the circuitry of this invention.

If such voltages are plotted against mass rate of fluid flow, the resulting curve appears substantially as shown in FIGURE 3. Due to the fact that such a resulting curve is not linear, difficulty is encountered in instrumentation and processing of data obtained. Thus, linearizing means including a function generator are employed for obtaining a straight line relationship between mass rate of fluid flow and voltage across the resistance element 28.

As shown in FIGURE 1, the biasing resistors 22a, 22b, 2c, and 22d are connected from line 18 to line L1. The positions of the taps 24 of the biasing resistors 22 and the rectifiers 44 are such that current is prevented from flowing through the conductor 30 until a given voltage occurs across the resistance elements 28 and 29. Therefore, if there is sufficient voltage between the conductor 30 and the line L1 caused by an increase in voltage across the resistance elements 28 and 29, current flows through the conductor 30, through the resistor 32, through the resistance combination of the elements 34, 35, and 37, through one or more of the resistors 40, and through one or more of the rectifiers 44 to one or more of the resistors 22.

As shown in FIGURE 1, the conductor 30 connects to a bridge network. Therefore, current flowing through the conductor 30 divides and flows through the resistor 32 and the resistance combination of the elements 34, 35, and 37 in accordance with the ratios between the effective resistance thereof and in accordance with the position of the taps 42 of the resistors 40.

When the voltage across the resistance element 28 is low, i.e., when the mass rate of fluid flow is low, the voltage between the line L1 and the conductor 30 is low. Therefore, the voltage applied to the taps 42 of the resistors 40 is low. As stated above, the taps 24 upon the biasing resistors 22 are arranged so that until the voltage of the conductor 30 with respect to the conductor L1 reaches a certain value, there is no current flow through any of the rectifiers 44.

Figure 4:
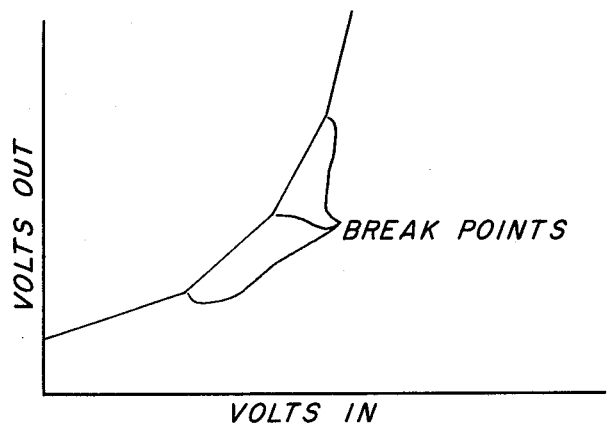
FIGURE 4 is a diagram illustrating the operation of a portion of the circuitry of this invention.

However, as the voltage between the line L1 and the conductor 30, caused by the resistance element 28 increases, current flows through the diode or rectifier 44d. Thus, there is a voltage created between the conductors 36 and 38. When the voltage between the conductor 30 and the line L1 increases further, there is also current flow through the rectifier or diode 44c, as well as through the diode 44d. Thus, there is a greater voltage between the conductors 36 and 38. As the voltage between the conductor 30 and the line L1 increases further, current also flows through the rectifier 44b. With further increase of voltage between the conductor 30 and the line L1, current also flows through the rectifier 44a. Thus, with a linear input the voltage response of this circuit appears as shown in FIGURE 4. The break points of FIGURE 4 indicate relative values at which current begins to flow through each of the diodes 44c, 44b, and 44a. The position of each of the taps 42 with respect to its respective resistor 40 determines the slope of each of the lines of FIGURE 4 from one break point to the next succeeding break point.

Figure 5:
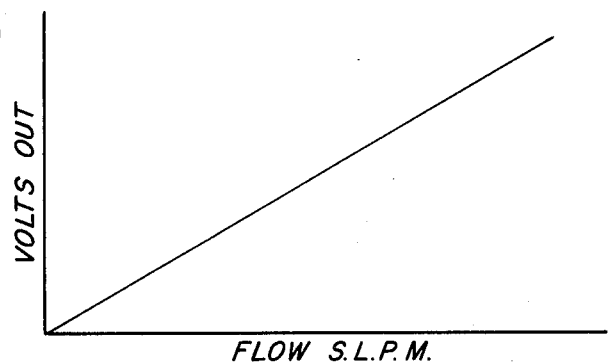
FIGURE 5 is a diagram illustrating the operation of an instrument of this invention.

Such a voltage response as shown in FIGURE 4 compensates for the non-linear response shown in FIGURE 3 so that the resulting voltage between the conductors 36 and 38 which is applied to the amplifier 50 is linear and appears as shown in FIGURE 5. This voltage appears across the output lines 52 and may be used to indicate and/or measure fluid flow or may be used to count pulsations or the like or may be applied to other uses.

Figure 6:
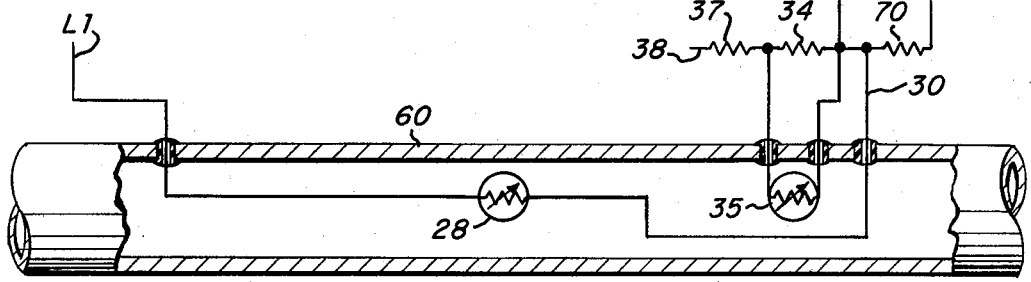
FIGURE 6 is a fragmentary schematic wiring diagram showing a modification of the instrument of this invention.

FIGURE 6 is a fragmentary view of a schematic wiring diagram showing a modification in a portion of the instrument of this invention.

The portions of the instrument of this invention as shown in FIGURE 1 which do not appear in FIGURE 6 remain the same as that of FIGURE 1.

A fixed resistor 70 is connected from the conductor 19 to the conductor 30. This fixed resistor 70 is disposed outside of the conduit 60 and is used instead of the resistor 26. The resistance element 29 does not appear in this circuit and the resistance element 28 is joined directly from the conductor 30 to the line L1. Therefore, the resistor 70 and the resistance element 28 serve as voltage divider elements between the line L1 and the conductor 19. Thus, fluid flow within the conduit 60 is sensed by the resistance element 28. The voltage across the resistance element 28 varies with changes in mass flow rate of the fluid. Thus, the voltage between the conductor 30 and the line L1 varies with changes in mass flow rate of the fluid.

The function generator network to which the conductor 30 is connected operates in the same manner as that described above with respect to FIGURE 1.

Figure 7:
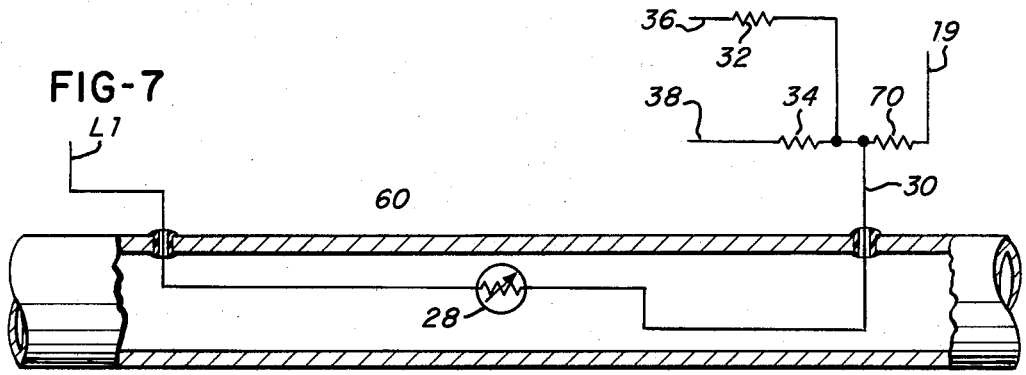
FIGURE 7 is a fragmentary schematic wiring diagram showing another modification of the instrument of this invention.

FIGURE 7 shows another modification in the instrument of this invention. The instrument of FIGURE 7 is similar to that of FIGURE 6 except that the resistance element 28 is the only element within the conduit 60. The resistance element 35 of the circuitry of FIGURES 1 and 6 is not a part of the circuitry of FIGURE 7. Also, the resistor 34 of FIGURE 7 is connected directly to the conductor 38, without the use of the resistor 37 shown in FIGURES 1 and 6.

Thus, the instrument of this invention as shown in FIGURE 7 is also capable of sensing the mass flow rate of fluid in the conduit 60. The instrument as shown in FIGURE 7 is primarily adapted for use under conditions of constant fluid temperature.

Figure 8:
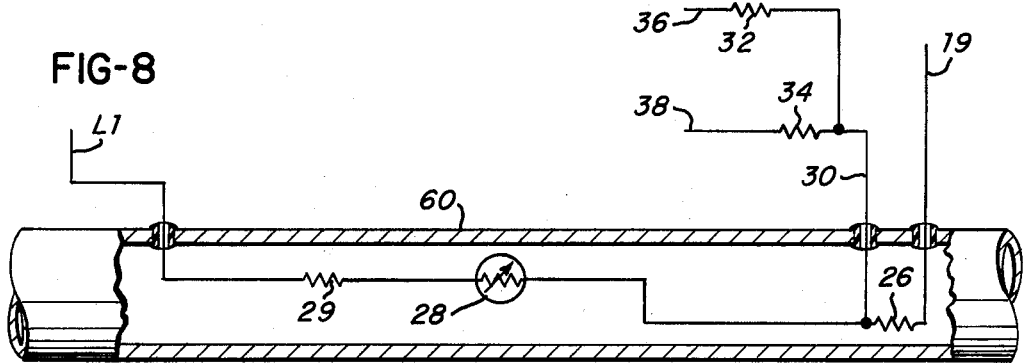
FIGURE 8 is a fragmentary schematic wiring diagram showing another modification of the instrument of this invention.

The instrument of this invention as shown in FIGURE 8 comprises circuitry somewhat similar to that of FIGURE 1. However, the resistance element 35 and the resistor 37 of the circuitry of FIGURE 1 do not appear in the circuitry of FIGURE 8. The circuitry of FIGURE 8 is also capable of sensing the mass flow rate of fluid within the conduit 60.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

The invention thus having been described, the following is claimed:

1. Fluid mass rate flow sensing apparatus for use with a fluid conduit having fluid therein comprising:

first impedance means within the fluid conduit, the first impedance means having negative resistance characteristics with respect to temperature, the first impedance means being adapted to be disposed within the fluid conduit, second impedance means within the fluid conduit, the second impedance means having positive resistance characteristics with respect to temperature, the second impedance means being connected in series relation to the first impedance means so that changes in impedance of the first impedance means resulting from changes in fluid temperature are substantially compensated for by changes in impedance of the second impedance means resulting from changes in fluid temperature, both the first and the second impedance means being within the same portion of the fluid conduit and that portion of the fluid conduit having substantially constant internal dimensions, conductor means connected to the first and second impedance means and adapted to be connected to a source of electrical energy to provide the first impedance means with sufficient voltage to pass current therethrough to heat the first impedance means to a temperature above that of the fluid so that the temperature of the first impedance means and thus the voltage across the first impedance means varies with changes in fluid mass flow in the conduit, the voltage across the first impedance means being a non-linear voltage with respect to fluid mass flow, a linearizing function generator connected to the first impedance means so that the non-linear voltage across the first impedance means is made substantially linear with respect to fluid mass flow.

2. Sensing apparatus for detecting mass rate of fluid flow within a fluid conduit comprising:

first impedance means within the fluid conduit, the first impedance means having negative resistance characteristics with respect to temperature, second impedance means within the fluid conduit, the second impedance means having positive resistance characteristics with respect to temperature, the second impedance means being connected in series relation to the first impedance means so that changes in impedance of the first impedance means resulting from changes in fluid temperature are substantially compensated for by changes in impedance of the second impedance means resulting from changes in fluid temperature, conductor means connected to the first impedance means and to the second impedance means and adapted to be connected to a source of electrical energy to provide the first impedance means with sufficient voltage to pass current therethrough to heat the first impedance means to a temperature above that of the fluid so that the temperature of the first impedance means varies with changes in fluid mass flow in the fluid conduit, the voltage across the first impedance means being a non-linear voltage with respect to fluid mass flow, a linearizing function generator connected to the first impedance means so that the non-linear voltage across the first impedance means is made substantially linear with respect to fluid mass flow, third impedance means, the third impedance means having negative resistance characteristics with respect to temperature, the third impedance means being connected to said linearizing function generator and disposed within said fluid conduit so that the third impedance means compensates the linearizing function generator such that the output of the linearizing function generator is substantially independent of the temperature of the fluid in the fluid conduit, the first impedance means and the second impedance means and the third impedance means being within the same portion of the fluid conduit and that portion of the fluid conduit having uniform internal dimensions.

3. Instrumentation for sensing mass rate of fluid flow within a fluid conduit comprising:

impedance means adapted to be disposed within the fluid conduit, the impedance means having a negative resistance characteristic with respect to temperature so that the impedance of the impedance means increases with decrease in temperature thereof and vice versa, means for connecting the impedance means to a source of electrical energy so that current is passed through the impedance means to cause heating thereof above the temperature of fluid within the fluid conduit so that the temperature of the impedance means and thus the voltage across the impedance means varies with changes in fluid mass flow in the fluid conduit, the voltage across the impedance means being a non-linear voltage with respect to fluid mass flow, a linearizing function generator connected to the impedance means so that the non-linear voltage across the impedance means is made substantially linear with respect to fluid mass flow, the linearizing function generator having first and second arms, one of the arms having a resistor element connected therein and disposed within the fluid conduit, the resistor element having a negative resistance characteristic with respect to temperature so that the resistor element compensates the linearizing function generator such that the output of the linearizing function generator is substantially independent of the temperature of the fluid in the fluid conduit.

References Cited by the Examiner

UNITED STATES PATENTS 3,078,713  2/1963  Schlieder _____ 73—205
3,097,527  7/1963  Davis et al. _____ 73—205

FOREIGN PATENTS 769,465  3/1957  Great Britain.

OTHER REFERENCES

Textbook: Analog Computation by Albert S. Jackson, published by McGraw-Hill Book Co., Inc., New York, 1960 (pages 485 to 490 relied on). (Copy in Group 430.)

RICHARD C. QUEISSER, *Primary Examiner.*